United States Patent
Widdowson

(10) Patent No.: US 6,807,222 B1
(45) Date of Patent: Oct. 19, 2004

(54) RECEIVING SPREAD SPECTRUM SIGNALS WITH NARROWBAND INTERFERENCE

(75) Inventor: Terence Widdowson, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/582,717

(22) PCT Filed: Jan. 15, 1999

(86) PCT No.: PCT/GB99/00130

§ 371 (c)(1),
(2), (4) Date: Jun. 30, 2000

(87) PCT Pub. No.: WO99/38270

PCT Pub. Date: Jul. 29, 1999

(30) Foreign Application Priority Data

Jan. 22, 1998 (EP) .............................. 98300440
Jan. 22, 1998 (GB) .............................. 9801386

(51) Int. Cl.[7] .............................................. H04B 1/707
(52) U.S. Cl. ...................................... 375/147; 375/350
(58) Field of Search ............................... 375/130, 140, 375/147, 148, 346, 348, 350; 370/337, 320, 332; 455/135, 227, 222, 223

(56) References Cited

U.S. PATENT DOCUMENTS

| | | | |
|---|---|---|---|
| 5,235,612 A | * 8/1993 | Stilwell et al. | ............. 375/144 |
| 5,377,225 A | * 12/1994 | Davis | .......................... 370/342 |
| 5,457,713 A | 10/1995 | Sanderford, Jr. et al. | |
| 5,588,020 A | * 12/1996 | Schilling | ..................... 370/337 |
| 5,896,374 A | * 4/1999 | Okumura et al. | ........... 375/130 |
| 6,141,372 A | * 10/2000 | Chalmers | ..................... 375/147 |
| 6,249,541 B1 | * 6/2001 | Uchida et al. | ............... 375/148 |

FOREIGN PATENT DOCUMENTS

| | | |
|---|---|---|
| EP | 0812069 | 12/1997 |
| EP | 0884855 A1 | 12/1998 |
| GB | 2241136 A | 8/1991 |

OTHER PUBLICATIONS

Widdowson, Terry, A CDMA Data Overlay of the GSM Network, 1994, 8th IEEE Intl. Symposium on Personal, Indoor, and Mobile Radio Communications, vol. 1, pp 160–163.*
Patent Abstracts of Japan, vol. 018, No. 148 (E–1522), Mar. 11, 1997 & JP 05 327658 A, Dec. 10, 1993.

* cited by examiner

*Primary Examiner*—Jean B. Corrielus
*Assistant Examiner*—Khanh cong Tran
(74) *Attorney, Agent, or Firm*—Nixon & Vanderhye P.C.

(57) ABSTRACT

A receiver receives spread spectrum signals which include unwanted narrowband signals, for example, radio signals which comprise a mixture of signals from signal sources using the Group Special Mobile (GSM) ETSI standard coding and from signal sources using Code Division Multiple Access (CDMA) coding. Both despreading of the spread spectrum signal and attenuating of predetermined frequencies (corresponding to the narrowband signal) of the spread spectrum signal are performed prior to downconverting. In another approach to decoding a spread spectrum signal in which an unwanted narrowband signal has been coded using a coding scheme with error correction capabilities, the narrowband signal is decoded, regenerated and subtracted prior to despreading of the spread spectrum signal.

18 Claims, 10 Drawing Sheets

RECEIVING SPREAD SPECTRUM SIGNALS WITH NARROWBAND INTERFERENCE

This application is a 371 of PCT/GB99/00130 filed on Jan. 15, 1999 has been inserted.

BACKGROUND OF THE INVENTION

1. Field of the Invention

This invention relates to receivers for receiving signals which comprise a mixture of signals from a plurality of sources where two of the signal sources use different coding schemes from each other. In particular this invention relates to receivers for receiving spread spectrum signals which also include unwanted narrowband signals, for example, radio signals which comprise a mixture of signals from signal sources using the Group Special Mobile (GSM) ETSI standard coding and from signal sources using Code Division Multiple Access (CDMA) coding.

2. Description of Related Art

Demand for systems and services which require the use of the radio spectrum has recently far outstripped the capacity of present systems. This means that future systems must provide significantly improved spectral efficiency. One technique which has been suggested is to allow wideband spread spectrum signals to share a common spectrum with conventional narrowband signals.

Spread spectrum signals use a bandwidth which is in excess of the minimum bandwidth required to transmit the information in the signal. One method of generating a spread spectrum signal is known as pseudo random noise modulation (or direct sequence modulation). The spectrum of a signal is spread using a spreading code at the transmitter. A corresponding receiver uses the same code to despread the spectrum. The technique used to despread the spectrum to regenerate the original data signal has the effect of spreading the spectrum of any other signals which are not correlated with the spreading code used by the transmitter. Where, as is usual, several wideband signals from different sources (using different codes) share the same frequency spectrum, this technique is known as Code Division Multiple Access (CDMA).

The transmitted narrowband signal generally has a high power spectral density compared with that of the transmitted wideband signal. In the narrowband signal receiver the wideband signal creates interference in the narrowband signal. Equally, once the combined received signal has been decoded by a spread spectrum receiver, the narrowband signal causes interference in the decoded spread spectrum signal.

One method which has been used to reduce the interference between the narrowband signal and the wideband signal is to use corresponding filters in the spread spectrum transmitter and receiver to attenuate those frequencies used by the narrowband signal. A notch filter in the spread spectrum transmitter reduces the interference in the narrowband signal from the wideband signal. A corresponding notch filter in the spread spectrum receiver attenuates the frequencies used by the narrowband signal prior to despreading the spectrum to decode the spread spectrum signal.

There are problems with using such techniques to reduce the cross signal interference. To minimise the signal removed by the attenuation filters which is outside the band used by the narrowband signal, filters with very sharp cut-offs are required.

However, in a system such as the GSM cellular network adjacent cells have transmitters using different frequencies. Therefore the receiver is required to receive different frequency bands according to which transmitter is being used. Filters which are required to attenuate these narrowband frequencies need to be programmable. Programmable filters are most easily achieved with digital hardware which implies the use of high order finite impulse response (FIR) filters. Such filters currently only work on signals up to a maximum of a few tens of megahertz so it is most convenient to implement such filtering at baseband.

Milstein and Schilling. "The CDMA Overlay Concept", International Symposium on Spread Spectrum Technologies and Applications 1996, disclose a spread spectrum transmitter and receiver which utilise a notch filter. The receiver performs filtering simultaneously with despreading at baseband.

Any non-linear distortion to the signal prior to attenuating those frequencies used by the narrowband signal means that any signal in the narrowband frequency range introduces noise outside that range. The power spectral density of the narrowband signal is typically many tens of dB higher than the power spectral density of the wideband signal. Any components between the radio frequency receiver and the filter must have a very large dynamic range in order to minimise noise introduced into the remaining wideband signal by such non-linear distortions.

If a non-linear coding method is used to increase the dynamic range of such components then there are resolution problems for the low-level wideband signal.

Therefore the problem with known systems which utilise an attenuating filter, is that performing filtering at baseband requires components prior to the filtering step to have a very large dynamic range, but filtering at high frequency is not possible using currently available digital programmable filters.

BRIEF SUMMARY OF THE INVENTION

According to the present invention there is provided an apparatus for decoding a spread spectrum signal comprising
means for generating a despreading signal for despreading the spectrum of a signal;
means for despreading the spectrum of a signal using the despreading signal;
means for downconverting a signal to produce a lower frequency signal; and
means for attenuating predetermined frequencies of a signal;
wherein the despreading means is connected to despread the spread spectrum signal prior to downconverting and the attenuating means is connected to attenuate predetermined frequencies of the spread spectrum signal prior to downconverting.

Preferably the received signal is a composite signal comprising a spread spectrum signal component and a narrowband signal component which has a much higher power spectral density than the spread spectrum signal component and the attenuated frequencies are those present in the narrowband signal component. Optionally the spectrum is de-spread using a pseudo noise code.

Advantageously, the attenuating means is connected to attenuate predetermined frequencies of the despreading signal and the resulting notched despreading signal is connected to simultaneously despread the spread spectrum signal and attenuate the predetermined frequencies of the spread spectrum signal.

According to another aspect of the invention there is provided an apparatus for decoding a spread spectrum signal comprising means for generating a despreading signal for despreading the spectrum of the signal; and attenuating means connected to attenuate predetermined frequencies of the despreading signal to provide a notched despreading signal; characterised in that the apparatus further comprises mixing means connected to mix the notched despreading signal with a signal from a local oscillator to provide an upconverted notched despreading signal; and mixing means connected to mix the upconverted notched despreading signal with the spread spectrum signal.

According to another aspect of the present invention, there is provided an apparatus for decoding a spread spectrum signal which has been transmitted via a transmission channel, said signal comprising a wanted spread spectrum signal component and an unwanted narrowband signal component, the narrowband signal having been coded using a coding scheme with error correction capabilities, said apparatus comprising a narrowband signal subtractor containing means for decoding and correcting the composite signal according to the narrowband signal coding scheme to provide a decoded version of the narrowband signal;

means to estimate the amplitude and phase characteristics of the transmission channel;

means to encode the decoded corrected signal according to the narrowband signal coding scheme to produce an estimated narrowband signal;

means to adjust the phase and amplitude of the estimated narrowband signal according to the estimated amplitude and phase characteristics; and means to subtract the adjusted signal from the received composite signal to provide an estimate of the spread spectrum signal component.

Preferably the narrowband coding scheme can also detect uncorrectable errors and in which the decoding means is arranged upon detection of an uncorrectable error to suppress the said subtraction.

In another embodiment there is also included means for attenuating the frequencies of the signal corresponding to the narrowband signal component wherein the decoding means is arranged upon detection of an uncorrectable error to cause the attenuating means to be used.

Corresponding methods for decoding spread spectrum signals are also provided.

Embodiments of the present invention will be described, by way of example only, with reference to the drawings where

DETAILED DESCRIPTION OF EXEMPLARY EMBODIMENTS

Figure 1:
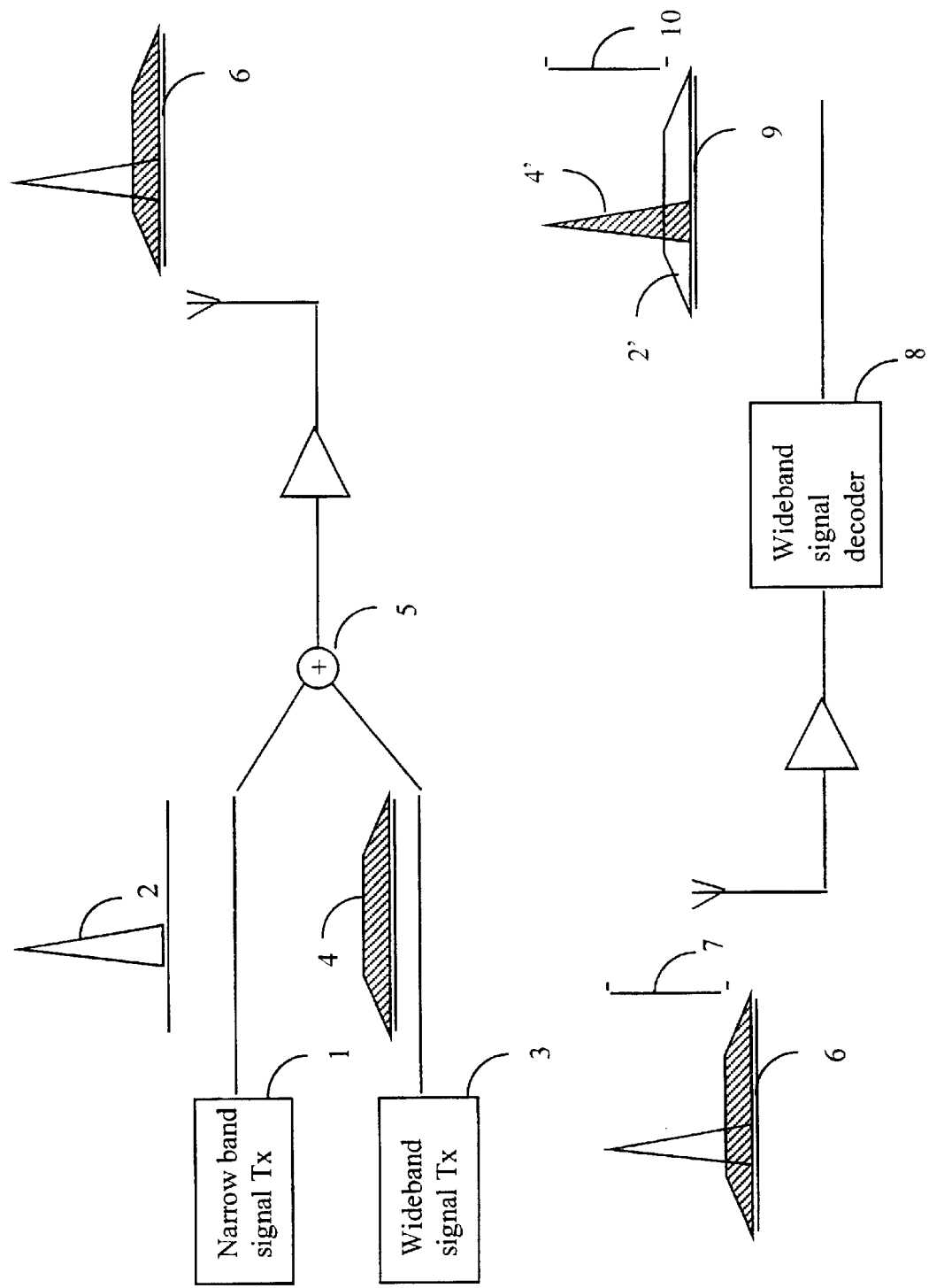
FIG. 1 shows the carrier to interference ratios for a high power spectral density narrowband signal and a low power spectral density wideband signal.

FIG. 1 shows a narrowband signal transmitter 1 transmitting a narrowband signal 2 and a wideband transmitter 3 transmitting a wideband signal 4. The wideband transmitter and the narrowband transmitter are connected to an adder 5. The wideband signal and the narrowband signal are summed at the adder 5 to create a composite signal 6. Of course, different transmitters in different locations may be used, the effect as far as the present invention is concerned is identical. The composite signal is received by a wideband signal decoder 8 where the signal is decoded producing a new composite signal 9. The spectrum of the original wideband signal 4 is despread by the decoder producing a decoded signal component 4' of the new composite signal 9 and the spectrum of the original narrowband signal 2 is spread to produce a new component 2' of the new composite signal 9. The new composite signal 9 has a carrier to interference ratio 10 for the decoded wideband signal 4'.

Figure 2:
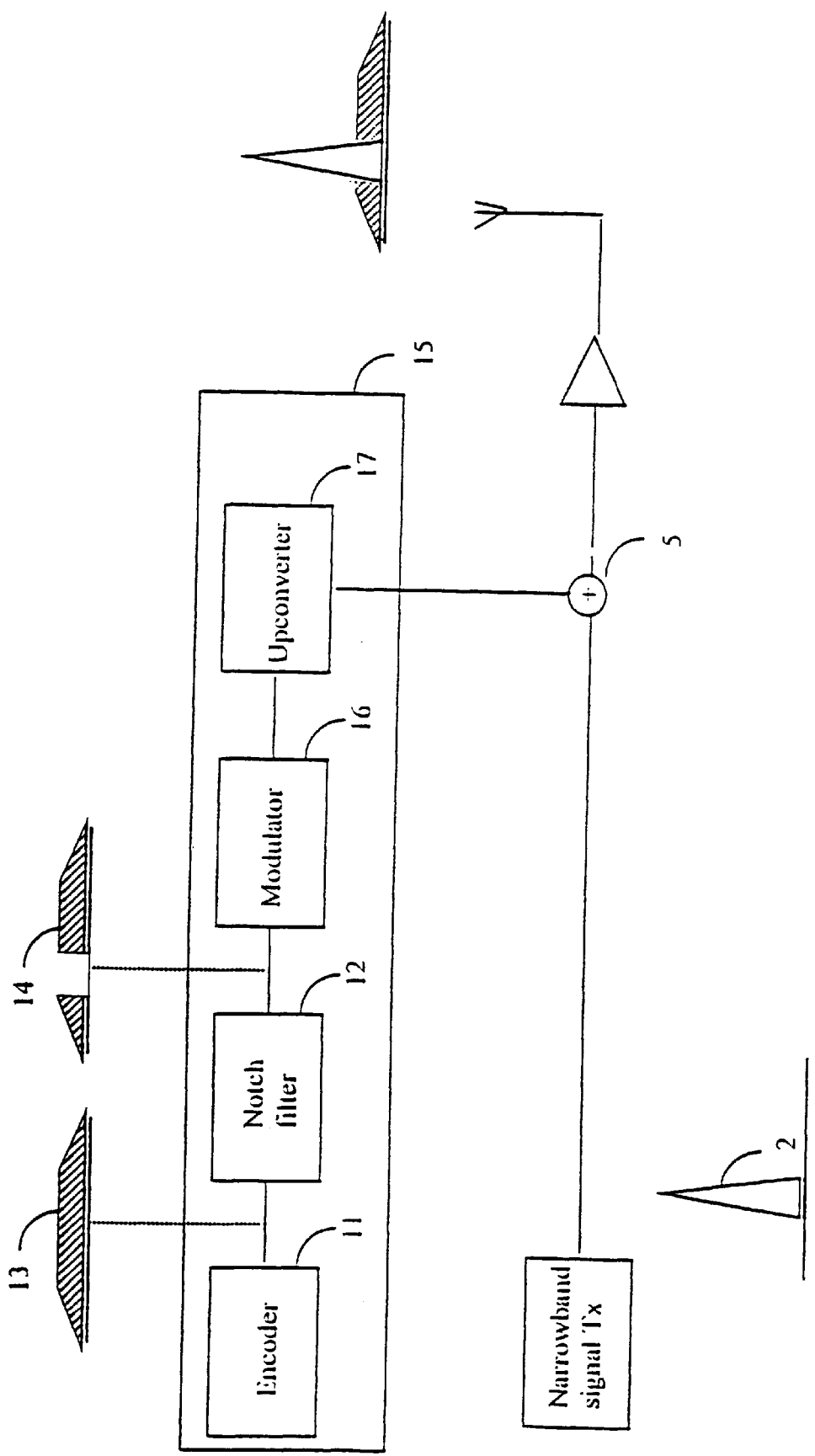
FIG. 2 shows a block diagram of a known composite signal transmitter using a notch filter to attenuate some frequencies in the transmitted wideband signal.

As far as the narrowband signal is concerned, the composite signal 6 has a carrier to interference ratio 7. To increase the carrier to interference ratio 7 for the narrow band signal 2 a notch filter may be inserted in the wideband signal transmitter 3 to attenuate the frequencies used by the narrowband signal. Such a notch filter will reduce the interference caused to the narrowband signal by the wideband signal. FIG. 2 shows a known wideband signal transmitter 15 comprising an encoder 11 connected to a notch filter 12 which is in turn connected to a modulator 16 and upconverter 17. The notch filter 12 is used to filter a wideband signal 13 to produce a notched signal 14 which is modulated and upconverted prior to summing at the adder 5 with the narrowband signal 2. Again, if different transmitters in different locations are used there is no material effect on the invention.

Figure 3A:
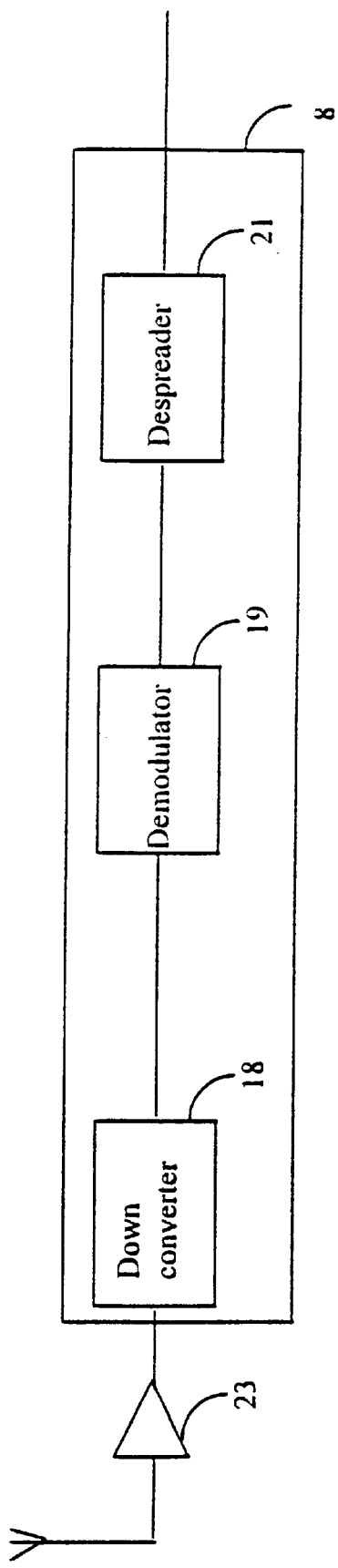
FIG. 3a shows a block diagram of a conventional spread spectrum signal receiver.
Figure 3B:
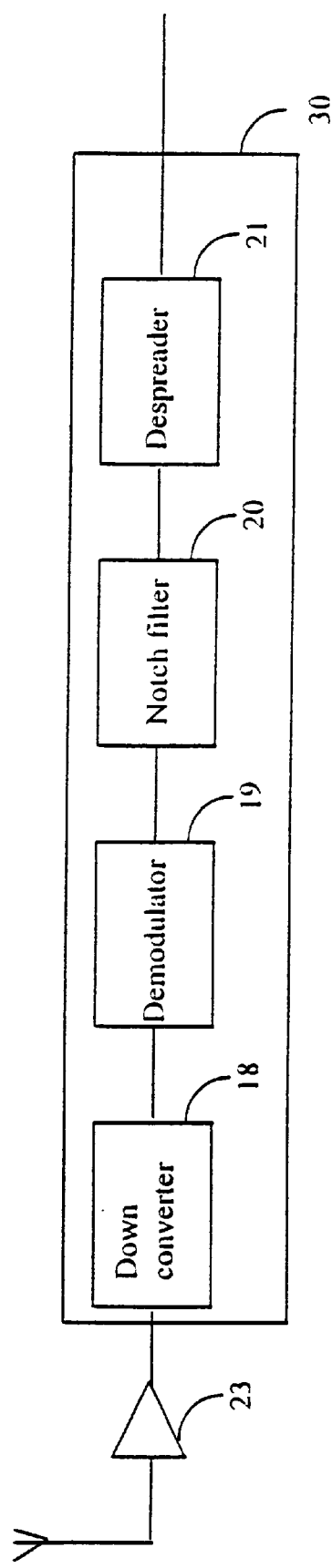
FIG. 3b shows a block diagram of a known spread spectrum signal receiver with a suppression filter to attenuate some frequencies in the received wideband signal.

To increase the carrier to interference ratio 10 for the despread wideband signal 4' a notch filter may be inserted in the wideband signal decoder 8 to attenuate the frequencies used by the narrowband signal. FIG. 3a shows a block diagram of a conventional spread spectrum signal receiver which comprises a receiver amplifier 23 which is connected to the wideband signal decoder 8 which comprises a downconverter 18 which is connected to a demodulator 19 which is in turn connected to a despreader 21. Of course, demodulation may take place either before or after despreading. FIG. 3b shows another embodiment of a wideband signal decoder 30 in which a notch filter 20 is used before the despreader 21. To minimise the spectrum removed from the wideband signal a notch filter with very sharp cut-offs is required.

Figure 4:
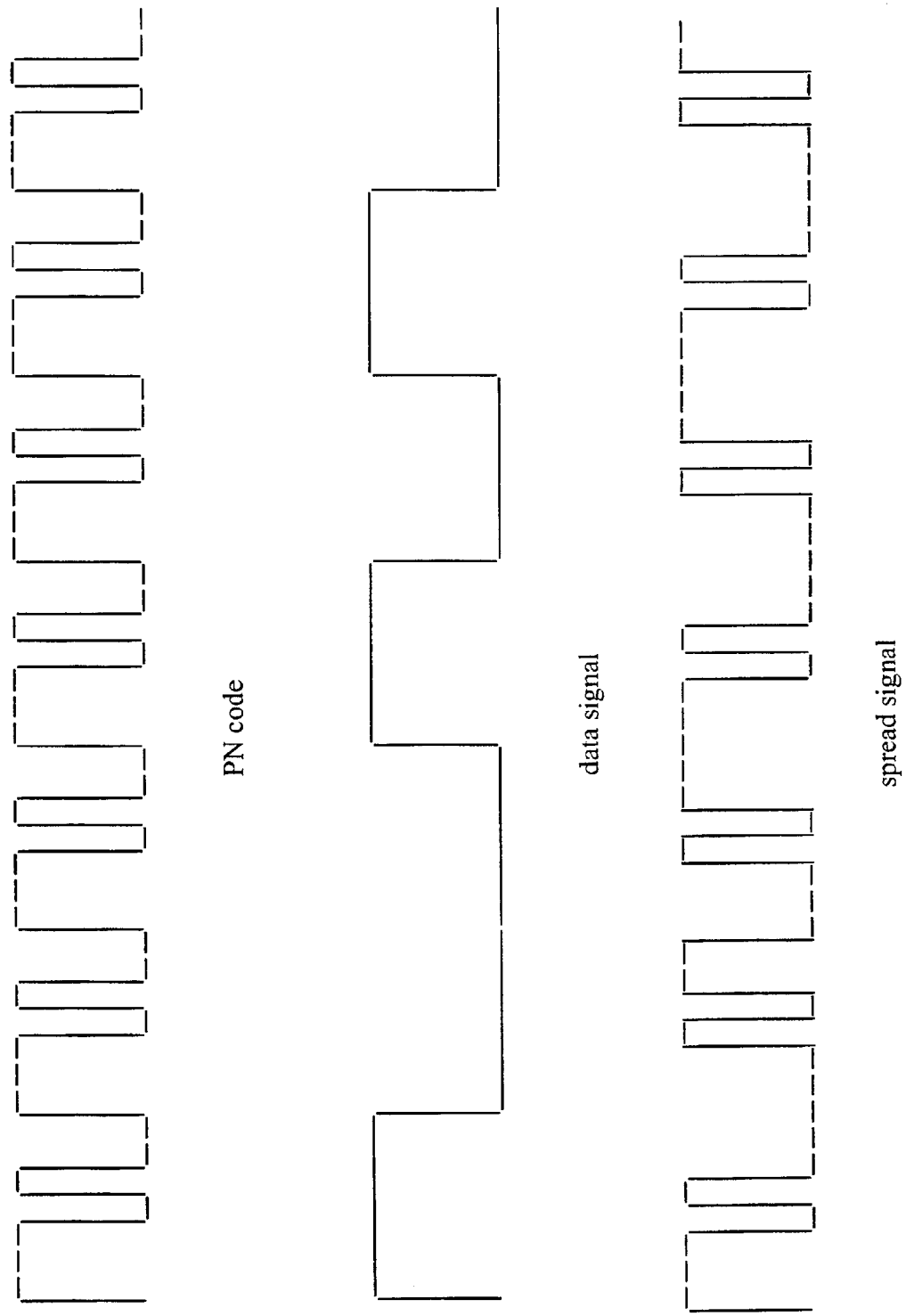
FIG. 4 shows a data signal encoded using a seven bit pseudo noise code.

One method of coding a data signal to generate a spread spectrum signal is to chop up an information bit into smaller increments of time which are known as 'chips'. These chips are generated by imposing a pseudo noise code onto the data signal. FIG. 4 shows a digital signal encoded using a seven bit pseudo noise code. In a practical implementation a pseudo noise code would be much longer than this. Pseudo noise codes are selected on the basis of particular mathematical properties which make the encoded signal appear somewhat noiselike. A corresponding decoder which knows which pseudo noise code has been imposed on the data signal is used to despread the spectrum of the spread spectrum signal to retrieve the original data signal.

Figure 5:
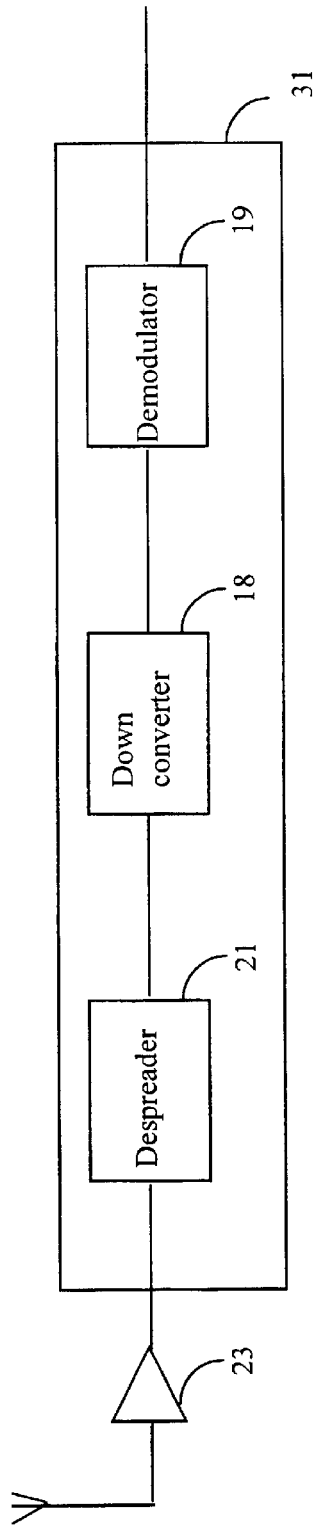
FIG. 5 shows a possible receiver architecture which despreads the signal prior to down conversion.

A disadvantage of despreading the signal at baseband as shown in FIG. 3a is that any noise added to the signal by the downconverter 18 or the demodulator 19 will result in interference. It is theoretically possible to despread the received signal before downconversion as shown in FIG. 5. In the wideband signal decoder 31 only noise in the narrower bandwidth of the despread signal 9 (see FIG. 1) will cause interference, and the result of such interference will be less as the despread signal has a much higher power spectral density than the original wideband signal. However, a suppression filter is required before the despreading step, as shown in FIG. 3b, in order to reduce interference from the narrowband signal 2 (see FIG. 1) and it is currently not possible to implement programmable digital notch filters with very sharp cut-offs which operate at the high frequencies required.

Figure 6:
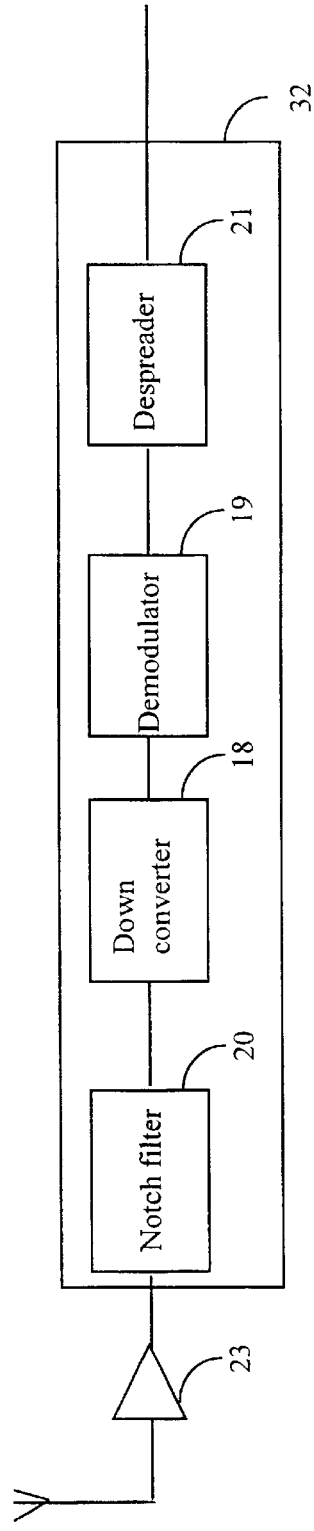
FIG. 6 shows a hypothetical receiver which uses a notch filter to attenuate predetermined frequencies of the received signal prior to downconversion of the signal.

It would also be advantageous to perform the filtering before the downconversion and demodulation because then only components which process the signal before the filter would need the large dynamic range required to avoid noise being introduced due to non-linearities. FIG. 6 shows a hypothetical architecture for such a receiver, however, as mentioned previously such an architecture could not be achieved using programmable digital filters in currently available hardware. An arrangement using analogue filters, where the required filter was selected from a bank of available filters would be possible, if unwieldy.

Figure 7:
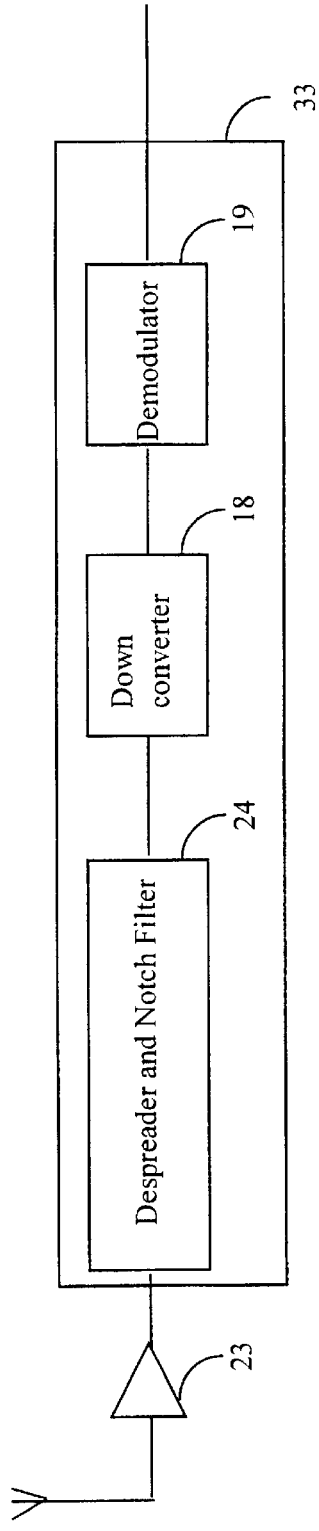
FIG. 7 shows a receiver which combines the despreading and filtering of the signal prior to downconversion in accordance with one embodiment of the present invention.
Figure 8:
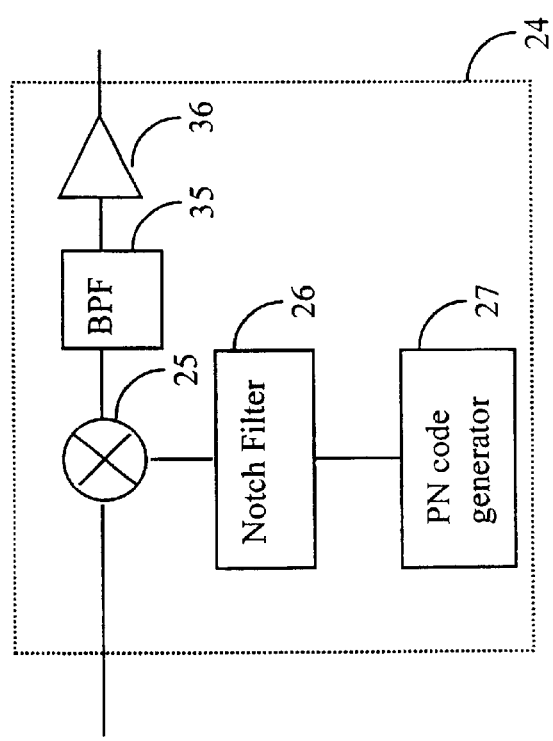
FIG. 8 shows a combined despreading and filtering device according to an embodiment of the present invention.

FIG. 7 shows a block diagram of a spread spectrum signal receiver in which both the despreading and filtering of the signal are performed together. Such an arrangement has both of the advantages discussed above, namely reduced noise bandwidth and that the only component requiring a large dynamic range is the receiver amplifier 23. The composite device may be implemented as shown in FIG. 8. Here a PN code generated by a PN code generator 27 is filtered at baseband by a digital programmable notch filter 26. The filtered PN code is then used to despread the incoming signal using a mixer 25, thus achieving the despreading and filtering of the incoming signal simultaneously, at the received frequency. After mixing by the mixer 25 the signal is filtered by a band-pass filter 35 and amplified by an amplifier 36.

Figure 9:
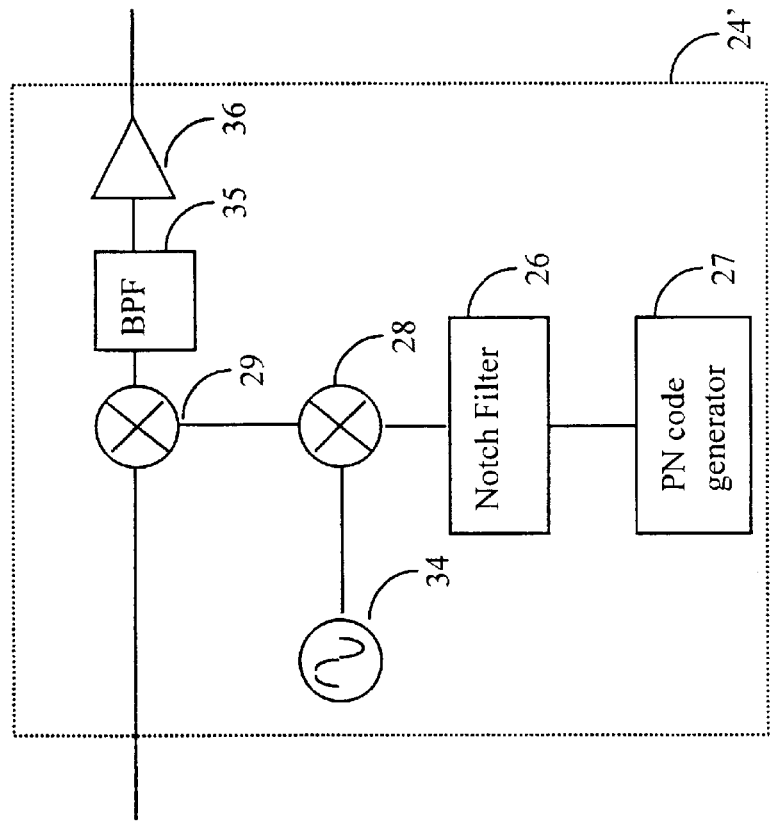
FIG. 9 shows combined despreading and filtering device according to an embodiment of the present invention.

FIG. 9 shows an improved arrangement which can be implemented with currently available hardware. Mixers which are optimised to operate with one high frequency and one low frequency input, such as is required for the mixer of FIG. 8, usually require a high power high frequency signal. However, in the embodiment shown in FIG. 8 the high frequency signal is a low power signal from an antenna. In the embodiment shown in FIG. 9, the mixer 25 is replaced by two mixers 28 and 29 and a local oscillator 34. The mixer 28 therefore receives a high power signal from the local oscillator 34 which is mixed with the filtered PN code received from the notch filter 26. This high power signal is then mixed with the low power signal received from the antenna amplifier 23. In this arrangement the received signal is simultaneously filtered downconverted and despread, so the downconverter 18 may be omitted or if further downconversion is required the downconverter 18 may be retained. The mixer 28 and the mixer 29 may be replaced with a single mixer.

Figure 9A:
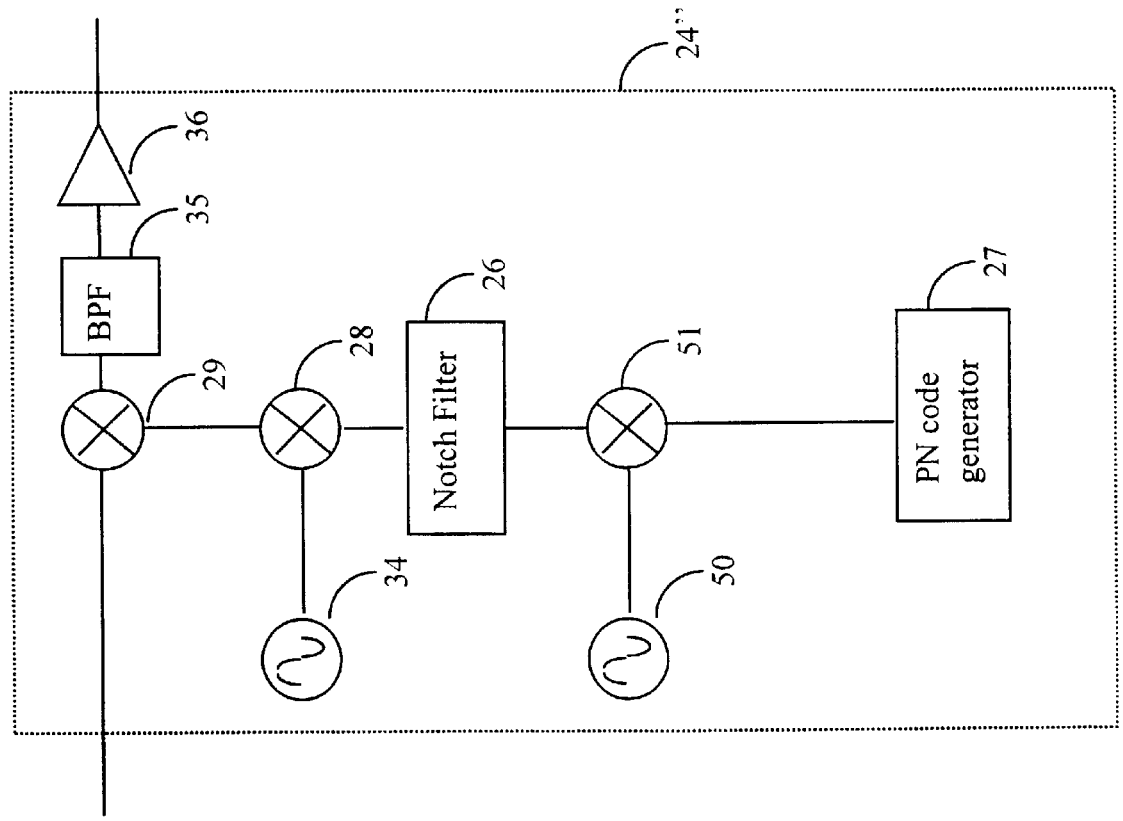
FIG. 9a shows combined despreading filtering and downconversion device according to another embodiment of the present invention.

In the arrangement shown in FIG. 9 the signal produced by the mixer 28 is symmetrical about a centre frequency ($F_c$) and has two ranges of attenuated frequencies at $F_c \pm$ the frequencies attenuated by the attenuating notch filter 26. The result of this is that twice the amount of the spectrum is removed than is necessary. If a further upconversion stage 50,51 is employed as shown in FIG. 9a then the PN code is upconverted to an intermediate frequency within the operating range of the notch filter 28 so that the signal produced by the mixer 28 only has one range of attenuated frequencies.

Figure 10:
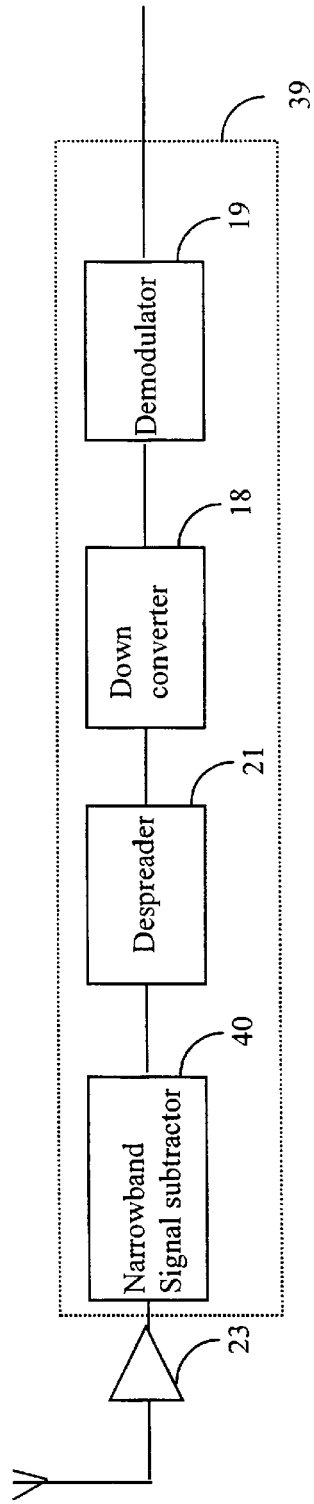
FIG. 10 shows a receiver which has a narrowband signal subtractor according to an embodiment of the present invention.

FIG. 10 shows a block diagram for another receiver 39 for decoding a composite signal comprising a high power narrowband signal component which has been coded using a coding scheme with some error correction capabilities; and a low power spread spectrum signal component. The narrowband signal subtractor 40 removes the high power narrowband signal component prior to despreading the spread spectrum signal component. In the narrowband signal subtractor 40, the composite signal is decoded according to the narrowband signal coding scheme, any errors introduced into the narrowband signal as a result of the low level spread spectrum signal are corrected at this stage and the resultant narrowband signal estimate is subtracted from the composite signal, resulting in a wideband signal which is a good estimate of the transmitted spread spectrum signal. Clearly the receiver 39 would be advantageous for receiving a signal in which the frequencies in the narrowband frequency range were not attenuated by the transmitter according to FIG. 2.

It would be possible to perform the narrowband signal subtraction after downconversion and demodulation. However, if the narrowband signal subtraction is done prior to downconversion and demodulation then there is the advantage, as discussed previously, that only the receiver amplifier 23 need to have a large dynamic range.

Figure 11:
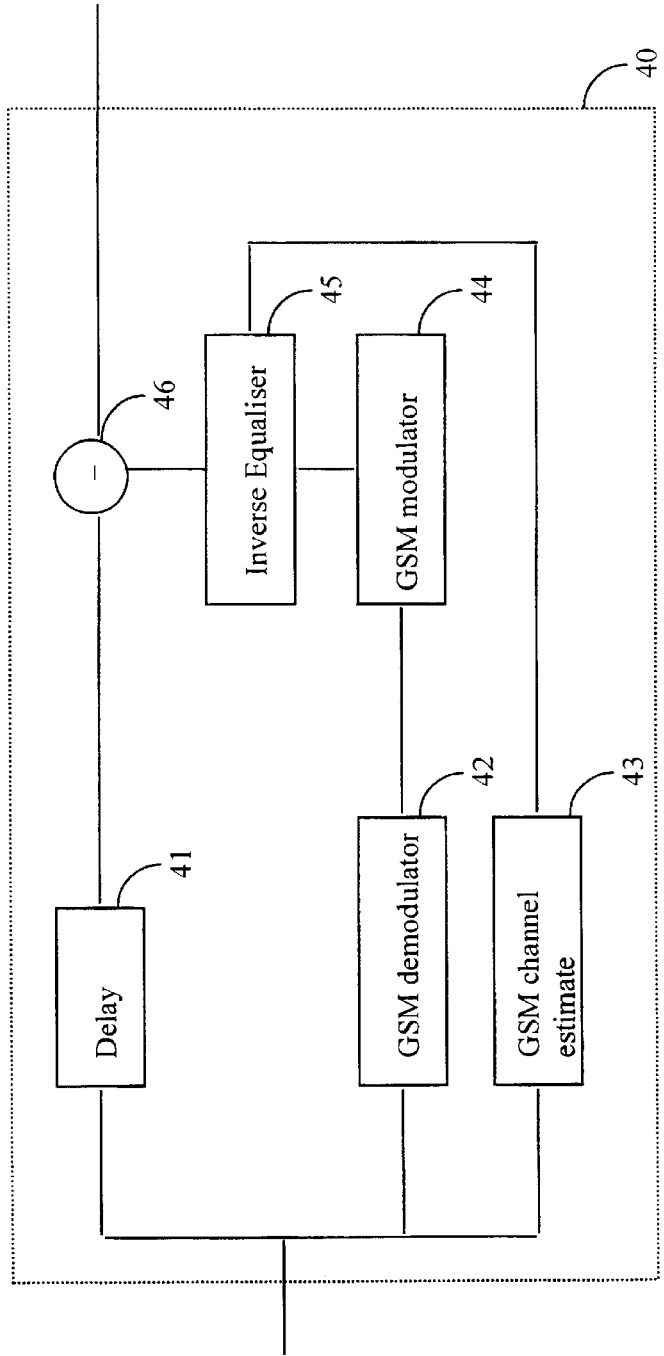
FIG. 11 show details of a narrowband signal subtractor.

FIG. 11 shows an embodiment of the narrowband signal subtractor 40 where the narrowband signal is coded using GSM. A received composite signal is demodulated by a GSM demodulator 42. The GSM demodulator 42 includes forward error correction and deinterleaving, as required. During demodulation error correction occurs, thus removing some or all of the errors introduced by any spread spectrum signal component. The demodulated corrected signal is then modulated by a GSM modulator 44 to produce an estimate of the transmitted GSM signal. The GSM modulator provides forward error correction bits and interleaving as necessary. In parallel with the modulation and demodulation steps the received composite signal is processed by a GSM channel estimator 43. This provides an estimate of the phase and amplitude changes and mulitipath delay introduced by the transmission channel. These estimates are used to adjust the phase and amplitude of the estimated signal by an inverse equaliser 45. This adjusted signal is subtracted by a subtractor 46 from a delayed version of the received composite signal. A delay element 41 compensates for the delay introduced by the elements 42, 44, 45 and 43. The GSM demodulator 42, the GSM modulator 44 and the GSM channel estimator 43 may be implemented using commonly available standard GSM microchips. The inverse equaliser 45 may be implemented using a programmable digital filter.

In practice it may be necessary to perform the inverse equalisation at a lower frequency than the received frequency, in which case the upconversion which is included in the GSM modulator 44 would be carried out instead after the inverse equalisation performed at 45.

Figure 12:
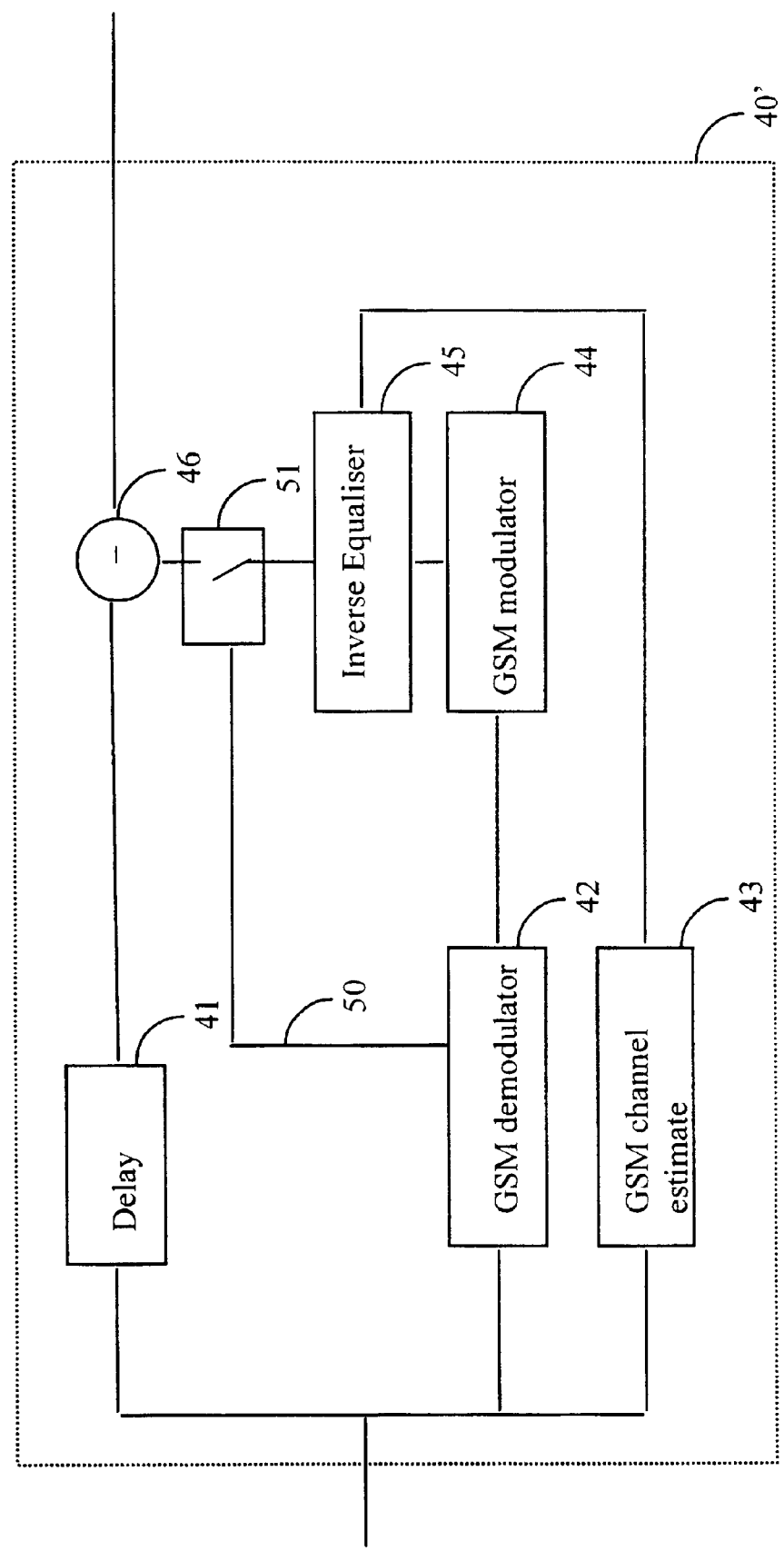
FIG. 12 shows a more sophisticated narrowband signal subtractor which does not subtract the estimated narrowband signal if uncorrectable errors are detected.

FIG. 12 show a block diagram of an improved narrowband signal subtractor 40' which can be used if the narrowband signal coding scheme can detect uncorrectable errors. If an uncorrectable error is detected by the demodulator 42 then an output 50 is used to control a switch 51 and the narrowband signal subtraction at 46 does not occur.

Figure 13:
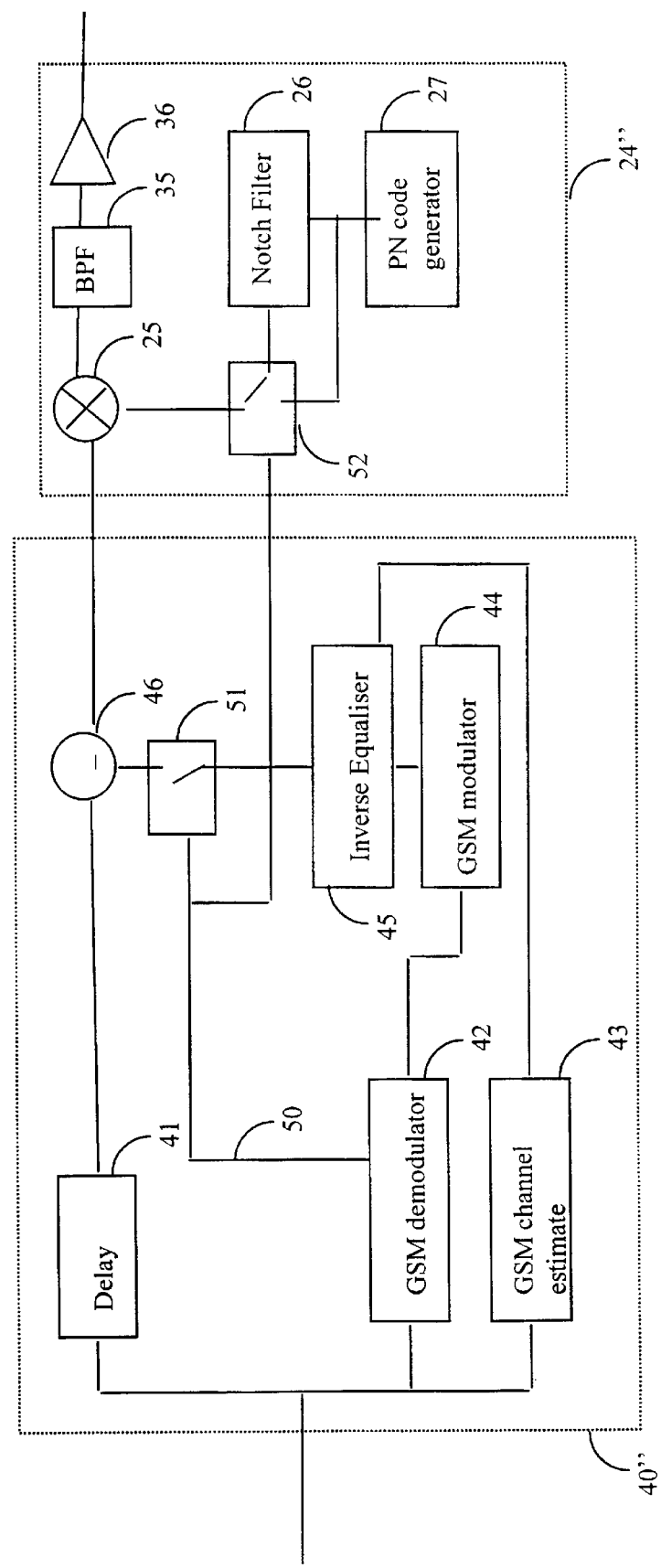
FIG. 13 shows an embodiment of the present invention in which the estimated narrowband signal is not subtracted if uncorrectable errors are detected, and in which a notch filter is used under those circumstances.

FIG. 13 shows a block diagram of another embodiment of a narrowband signal subtractor 40" connected to a combined despreader and notch filter 24" which replaces the despreader 21 (FIG. 10) an improved receiver. In this embodiment the output 50 is used to control both the switch 51 to bypass narrowband signal subtraction and to control a switch 52 to control whether the notch filter 26 is bypassed. When an uncorrectable error is detected the narrowband signal subtraction is bypassed and the notch filter 26 is used instead.

What is claimed is:

1. An apparatus for decoding a spread spectrum signal comprising:
    means for generating a despreading signal for despreading the spectrum signal;
    a notch filter arranged to attenuate predetermined frequencies of the despreading signal to produce a notched despreading signal;
    means for despreading the spectrum signal using said notched despreading signal so as to simultaneously despread the spread spectrum signal and attenuate the predetermined frequencies of the spread spectrum signal;
    means for downconverting a signal to produce a lower frequency signal;
    wherein no downconversion of the spread spectrum signal occurs prior to said despreading and attenuation.

2. An apparatus according to claim 1 in which the spread spectrum signal to be decoded is a composite signal comprising a spread spectrum signal component and a narrowband signal component which has a much higher power spectral density than the spread spectrum signal component and the attenuated predetermined frequencies are those present in the narrowband signal component.

3. An apparatus according to claim 1 in which the spread spectrum is despread using a pseudo noise code.

4. An apparatus according to claim 1 in which the downconverting means comprises:
    a mixer arranged to mix the notched despreading signal with a signal from a local oscillator to provide an upconverted notched despreading signal; and
    a mixer arranged to mix the upconverted notched despreading signal with the spread spectrum signal, whereby the spread spectrum signal is simultaneously attenuated, despread and downconverted.

5. An apparatus according to claim 4, further comprising a mixer operable to convert the despreading signal to an intermediate frequency prior to its attenuation by the notch filter.

6. An apparatus for decoding a spread spectrum signal which has been transmitted via a transmission channel, said spread spectrum signal comprising a wanted spread spectrum signal component and an unwanted narrowband signal component, a narrowband signal having been coded using a coding scheme with error correction capabilities, said apparatus comprising a narrowband signal subtractor containing:
    means for decoding and correcting a composite signal according to the narrowband signal coding scheme to provide a decoded version of the narrowband signal;
    means to estimate amplitude and phase characteristics of the transmission channel;
    means to encode the decoded corrected narrowband signal according to the narrowband signal coding scheme to produce an estimated narrowband signal;
    means to adjust phase and amplitude of the estimated narrowband signal according to the estimated amplitude and phase characteristics; and
    means to subtract the adjusted estimated narrowband signal from the received composite signal to provide an estimate of the spread spectrum signal component.

7. An apparatus for decoding a spread spectrum signal which has been transmitted via a transmission channel, said spread spectrum signal comprising a wanted spread spectrum signal component and an unwanted narrowband signal component, a narrowband signal having been coded using a coding scheme with error correction capabilities, said apparatus comprising a narrowband signal subtractor containing:
    means for decoding and correcting a composite signal according to the narrowband signal coding scheme to provide a decoded version of the narrowband signal;
    means to estimate amplitude and phase characteristics of the transmission channel;
    means to encode the decoded corrected narrowband signal according to the narrowband signal coding scheme to produce an estimated narrowband signal;
    means to adjust phase and amplitude of the estimated narrowband signal according to the estimated amplitude and phase characteristics of the transmission channel; and
    means to subtract the adjusted estimated narrowband signal from the received composite signal to provide an estimate of the spread spectrum signal component;
    wherein the narrowband coding scheme can also detect uncorrectable errors and in which the decoding means is arranged upon detection of an uncorrectable error to suppress the subtraction.

8. An apparatus according to claim 7 further comprising means for attenuating the frequencies of the signal corresponding to the narrowband signal component wherein the decoding means is arranged upon detection of an uncorrectable error to cause the attenuating means to be used.

9. A method for decoding a spread spectrum signal comprising:
    generating a despreading signal for despreading the spread spectrum of a signal;
    attenuating predetermined frequencies of the despreading signal to produce a resulting notched despreading signal;
    despreading the spread spectrum signal of the spread spectrum signal using the notched despreading signal so as to simultaneously despread the spread spectrum signal and attenuate the predetermined frequencies of the spread spectrum signal;

downconverting a signal to produce a lower frequency signal; and attenuating predetermined frequencies of the spread spectrum signal;

wherein no downconversion of the spread spectrum signal is performed prior to said despreading and attenuation.

10. A method according to claim 9 in which the spread spectrum signal to be decoded is a composite signal comprising a spread spectrum signal component and a narrowband signal component which has a much higher power spectral density than the spread spectrum signal component and the attenuated predetermined frequencies are those present in the narrowband signal component.

11. A method according to claim 9 in which the spread spectrum is despread using a pseudo noise code.

12. A method according to claim 9 wherein the downconverting comprises:

mixing the notched despreading signal with a signal from a local oscillator to provide an upconverted notched despreading signal; and mixing the upconverted notched despreading signal with the spread spectrum signal, whereby the spread spectrum signal is simultaneously attenuated, despread and downconverted.

13. A method according to claim 12, further comprising converting the despreading signal to an intermediate frequency prior to its attenuation.

14. A method for decoding a spread spectrum signal which has been transmitted via a transmission channel, said spread spectrum signal comprising a wanted spread spectrum signal component and an unwanted narrowband signal component, a narrowband signal having been coded using a coding scheme with error correction capabilities, said method including narrowband signal subtraction comprising:

decoding and correcting a composite signal according to the narrowband signal coding scheme to provide a decoded version of the narrowband signal;

estimating amplitude and phase characteristics of the transmission channel;

encoding the decoded corrected narrowband signal according to the narrowband signal coding scheme to produce an estimated narrowband signal;

adjusting phase and amplitude of the estimated narrowband signal according to the estimated amplitude and phase characteristics of the transmission channel; and subtracting the adjusted estimated narrowband signal from the received composite signal to provide an estimate of the spread spectrum signal component.

15. A method for decoding a spread spectrum signal which has been transmitted via a transmission channel, said spread spectrum signal comprising a wanted spread spectrum signal component and an unwanted narrowband signal component, a narrowband signal having been coded using a coding scheme with error correction capabilities, said method including narrowband signal subtraction comprising:

decoding and correcting a composite signal according to the narrowband signal coding scheme to provide a decoded version of the narrowband signal;

estimating amplitude and phase characteristics of the transmission channel;

encoding the decoded corrected narrowband signal according to the narrowband signal coding scheme to produce an estimated narrowband signal;

adjusting phase and amplitude of the estimated narrowband signal according to the estimated amplitude and phase characteristics of the transmission channel; and subtracting the adjusted estimated narrowband signal from the received composite signal to provide an estimate of the spread spectrum signal component;

wherein the narrowband coding scheme can also detect uncorrectable errors and in which upon detection of an uncorrectable error, subtracting the narrowband signal is omitted.

16. A method according to claim 15 further including attenuating the frequencies of the signal corresponding to the narrowband signal component upon detection of an uncorrectable error.

17. An apparatus for decoding a spread spectrum signal comprising:

means for generating a despreading signal for despreading the spread spectrum of a signal;

means for despreading the spread spectrum of a signal using the despreading signal;

means for downconverting a signal to produce a lower frequency signal; and means for attenuating predetermined frequencies of a signal;

wherein the despreading means is connected to despread the spread spectrum signal prior to downconverting and the attenuating means is connected to attenuate predetermined frequencies of the spread spectrum signal prior to downconverting; and the attenuating means is connected to attenuate predetermined frequencies of the despreading signal and a resulting notched despreading signal is connected to simultaneously despread the spread spectrum signal and attenuate the predetermined frequencies of the spread spectrum signal.

18. A method for decoding a spread spectrum signal comprising:

generating a despreading signal for despreading the spread spectrum signal;

despreading the spread spectrum signal using the despreading signal;

downconverting a signal to produce a lower frequency signal; and attenuating predetermined frequencies of a signal;

wherein despreading of the spread spectrum signal is performed prior to downconverting and attenuating of predetermined frequencies of the spread spectrum signal is performed prior to downconverting; and the predetermined frequencies of the despreading signal are attenuated and a resulting notched despreading signal is used to simultaneously despread the spread spectrum signal and attenuate the predetermined frequencies of the spread spectrum signal.

* * * * *